United States Patent [19]

Myles

[11] 4,246,798
[45] Jan. 27, 1981

[54] PRESSURE INDICATOR

[75] Inventor: J. Edgar Myles, W. Bloomfield, Mich.

[73] Assignee: J. E. Myles, Inc., Troy, Mich.

[21] Appl. No.: 99,959

[22] Filed: Dec. 3, 1979

Related U.S. Application Data

[63] Continuation-in-part of Ser. No. 31,270, Apr. 18, 1979, Pat. No. 4,199,992, Continuation of Ser. No. 945,762, Sep. 25, 1978, abandoned.

[51] Int. Cl.³ .............................................. G01L 7/16
[52] U.S. Cl. ..................................................... 73/744
[58] Field of Search .............. 73/744, 745, 746, 146.8, 73/146.3

[56] References Cited

U.S. PATENT DOCUMENTS

| | | | |
|---|---|---|---|
| 3,286,726 | 11/1966 | Guy | 73/744 |
| 3,596,521 | 8/1968 | Guy | 73/744 |
| 3,677,089 | 7/1972 | Martin | 73/744 |
| 3,889,530 | 6/1975 | Bluem | 73/146.8 |
| 3,910,120 | 10/1975 | Martin | 73/744 |
| 4,136,560 | 1/1979 | Gellos | 73/146.8 |

Primary Examiner—Donald O. Woodiel
Attorney, Agent, or Firm—Cullen, Sloman, Cantor, Grauer, Scott & Rutherford

[57] ABSTRACT

The pressure indicator has a body provided with an attachment shank having a pressure fluid passage. A cylinder bore is located at one end of the body and communicates with the passage. An end plug having a bore and a counterbore is threaded into the body. The bore terminates at the plug inner end in a first annular flat abutment surface. The counterbore terminates in a second annular flat abutment surface which is located between the inner and outer ends of the plug and forms one end of the plug bore. A piston is nested in the cylinder bore having a piston rod axially extending through the cylinder bore and projecting through and outwardly of the plug. A compression spring is interposed between the plug and piston and yieldably biases the piston towards one end of the cylinder bore. The piston is variably movable longitudinally against the spring on application of pressure to the pressure fluid passage. An integral annular spring retainer and bearing assembly is provided having a bore through which the piston rod extends. The assembly has an annular bearing, an annular spring guide and a flange separating the bearing from the guide. The bearing extends into and pilots in the bore of the end plug and is spaced from the second abutment surface, with the flange abutting the first abutment surface and the spring guide piloting one end of the compression spring.

15 Claims, 3 Drawing Figures

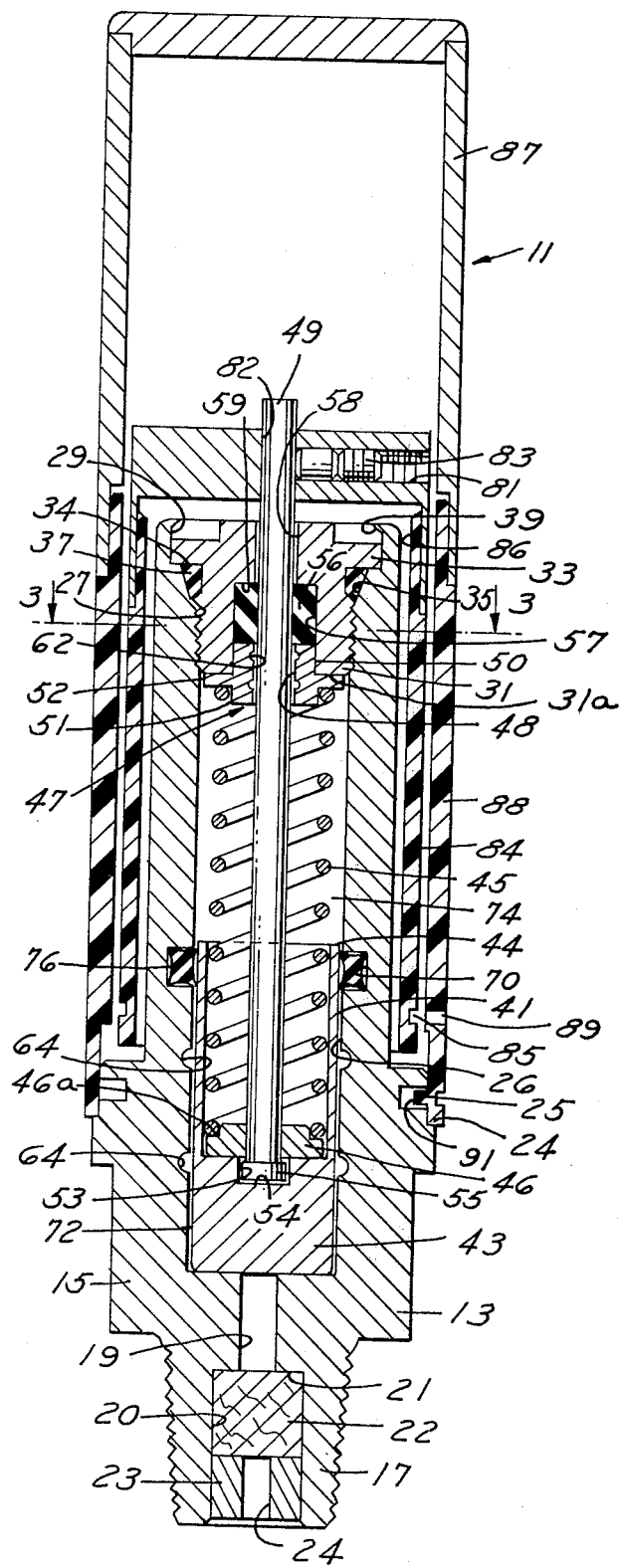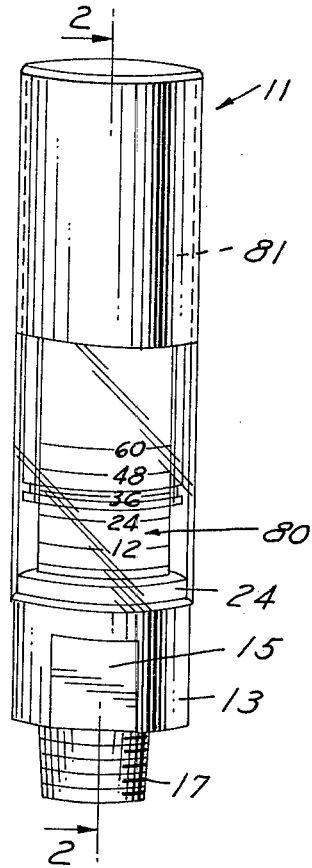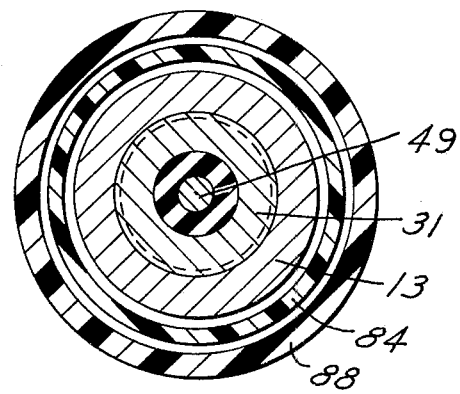

PRESSURE INDICATOR

CROSS-REFERENCES TO RELATED APPLICATIONS

This patent application is a continuation-in-part application of U.S. Patent Application Ser. No. 031,270, now U.S. Pat. No. 4,199,992 which was filed on Apr. 18, 1979 for PRESSURE INDICATOR, which in turn was a continuation application of U.S. Patent Application Ser. No. 945,762, filed on Sept. 25, 1978 entitled PRESSURE INDICATOR, now abandoned.

BACKGROUND OF THE INVENTION

Pressure indicators of the type disclosed are known to include metallic body with a threaded attachment shank having a pressure fluid passage adapted for connection to a source of pressure to be measured. A cylindrical bore is provided within the body which communicates with the passage and has a threaded open end receiving an end plug having a bore and which is threaded into the body. A piston is nested in the cylinder and has a piston rod axially extending through the cylinder bore and through the plug. A compression spring is interposed between the plug and piston retainingly engaging the piston and the piston being variably movable longitudinally against the spring on application of fluid under pressure, with the extent of movement providing a visual indication of the pressure applied. Examples of this type of pressure indicator are shown in U.S. Pat. No. 3,677,089 of Clyde J. Martin, granted July 18, 1972 and U.S. Pat. No. 3,910,210 of Clyde J. Martin, granted Oct. 7, 1975.

SUMMARY OF THE INVENTION

It is a feature of the present invention to provide a pressure indicator having a body with an attachment shank provided with a pressure fluid passage. A cylinder bore is provided in the body and at one end communicates with the passage. The other end of the body is open and threaded. An end plug with inner and outer ends has a bore and a counterbore and is threaded into the open end of the body. The plug bore terminates at the inner end in a first annular abutment surface which faces one end of the body. The counterbore of the end plug terminates in a second annular flat abutment surface located between the inner and outer ends of the plug and forms one end of the plug bore.

It is a further feature of the present invention to provide a pressure indicator of the aforementioned type wherein a tubular piston is nested within the cylinder bore having an elongated piston rod axially extending through the cylinder bore and projecting through and outwardly of the plug. A compression spring is interposed at its ends between the end plug and the base of the hollow piston yieldably biasing the piston towards said one end of the cylinder bore. The piston is variably movable longitudinally against the spring on application of pressure to the fluid passage.

It is a still further feature of the present invention to provide a pressure indicator of the aforementioned type wherein an annular bearing element is nested within the plug bore and abuts the second abutment surface. The bearing element axially and guidably receives the piston rod. An integral spring retainer and bearing assembly is provided having a bore through which the piston rod extends. The assembly has an annular bearing, an annular spring guide and an annular flange separating the bearing from the guide. The bearing extends into and pilots in the bore of the end plug and engages the annular bearing element. The flange abuts the first abutment surface.

Another feature of the present invention is to provide a pressure indicator of the aforementioned type wherein the bore of the retainer and bearing assembly has a surface spaced from the piston rod and provided with annular balancing grooves for equalizing the pressure of the fluid acting on the piston rod throughout 360° thereby centering the piston rod.

Still another feature is to provide a pressure indicator of the aforementioned type wherein the piston is formed separately from the piston rod, with the piston being hollow and closed at one end. The closed end has a recess and the piston rod has a head received in the recess.

Another feature is to provide a pressure indicator of the aforementioned type wherein a spring keeper surrounds the piston rod and is located within the hollow piston, with the compression spring biasing the keeper against the closed end of the piston to thereby retain the piston rod head in the recess.

Still another feature is to provide a pressure indicator of the aforementioned type wherein the cylinder bore intermediate its ends is provided with an annular groove which divides the bore into a pressure zone and a non-pressure zone. An annular seal is located in the groove and is sealingly engageable with the piston throughout its movement in the cylinder bore to prevent fluid in the pressure zone from entering the non-pressure zone.

Still another feature of this invention is to provide a pressure indicator of the aforementioned type which includes providing fluid balancing grooves in the wall of the cylinder bore in the pressure zone.

BRIEF DESCRIPTION OF THE DRAWINGS

FIG. 1 is a front perspective view of the pressure indicator.

FIG. 2 is a vertical section of the pressure indicator, on an increased scale, and looking in the direction of arrows 2—2 of FIG. 1; and FIG. 3 is a section of the pressure indicator looking in the direction of arrows 3—3 of FIG. 2.

It will be understood that the above drawings illustrate merely preferred embodiments of the invention, and that other embodiments are contemplated within the scope of the claims hereafter set forth.

DETAILED DESCRIPTION OF THE PREFERRED EMBODIMENT

Referring now to the drawing, the pressure indicator or gauge is designated at 11 in FIGS. 1 and 2, and includes an elongated metallic body 13 of cylindrical form having adjacent its lower end on opposite sides thereof a pair of wrench-engaging flats or flat surfaces 15. The body 13 terminates in the threaded assembly shank 17 having therethrough pressure fluid passage 19. The passage 19 at its outer end is provided with an enlarged bore or cavity 20 having an abutment surface 21. A filter 22 is located in cavity 20 and is held against abutment surface 21 by a restrictor 23 having a passage 24 which is smaller in diameter than passage 19. The filter 22 is made from porous bronze material.

The body 13 includes adjacent the flats 15, an annular stop shoulder 24 and thereabove an annular groove 25 and includes an elongated cylinder bore 26. The upper end of the body 13 has a threaded bore 27 and outwardly thereof a counterbore 29 of increased radius.

End plug 31 is snugly threaded into bore 27 and includes across its top a transverse flange 33 of increased radius. The flange 33 is nested within the counterbore 29 and bears against the adjacent shoulder 34 as shown in FIG. 2.

Below the shoulder 34 is an annular inwardly extending tapered surface 35 which is spaced from the plug 31. Within the space and under compression is the O-ring 37 which is snugly interposed between the tapered surface 35 and the plug 31 engaging and being located below top flange 33. This completes the seal between the plug 31 and the body 13.

The upper end of the body 13 adjacent its counterbore 29 has an inturned-portion or stop 39 which is adapted to limit relative outward movement of the flange 33 and plug 31 should an excessive pressure be so applied to the plug 31. In the event the gauge 11 is over-pressurized, the top flange 33 will open allowing the over-pressure to relieve over a controlled orifice area. This provides a safety relief valve feature preventing uncontrolled explosion or missiling in the event the gauge 11 is over-pressurized.

In the present construction, the plug 31 and the threading therein is constructed to have an excessive shear strength such that, the flange 33 of the plug 31 would actually bend before the threads sheared. The pressure indicator 11 has been tested to withstand high as well as low pressures including indicators operating from 0 to 400 PSIG and at 1000 PSIG, 2000 PSIG, 3000 PSIG and 5000 PSIG.

Nested within the cylinder bore 26 of the body 13 is the elongated tubular piston 41 having one end 43 closed and generally solid. The other end 44 of the piston 41 is open and receives and guides the compression spring 45. The spring 45 is disposed inside the wall of the tubular piston 41 and is interposed between seat 46 and the integral spring retainer and bearing assembly 47 which fits within and also underlies plug 31. The inside diameter of the tubular piston 41 is slightly greater than the outside diameter of the spring 45. Assembly 47 has a through bore 48 through which the piston rod 49 extends. Assembly 47 has an annular bearing 50, an annular spring guide 51 and an annular flange 52 separating the bearing 50 and guide 51. Flange 52 abuts the first annular flat abutment surface 31a provided on the inner end of end plug 31 where the bore 57 terminates. The spring seat 46 includes an abutment surface 46a for the spring 45.

The elongated piston rod 49 extends axially of and through the tubular piston 41. The piston 41 has a centrally located recess 53 having a stop surface 54. The rod 49 has the annular seat 46 slidable thereon and the seat generally rests at the bottom of the chamber 26 in close proximity to the head 55 which is provided on one end of the rod 49. The head 55 is received in recess 53 of the piston 41 when the rod and piston are assembled. The rod 49 is adapted to extend up through end plug 31 and outwardly of the end of the body 13 as shown in FIG. 2. The spring 45 urges the piston 41, rod 49 and spring seat 46 towards the end of the cylinder bore 26 adjacent passage 19.

The end plug 31 has the bore 57 and a counterbore 58. The counterbore 58 terminates in a second annular flat abutment surface 59 located between the inner and outer ends of the plug 31 and which forms one end of the plug bore 57. An annular bearing element 56 made from a permanently lubricated material such as Teflon occupies bore 57 and surrounds the piston rod 49. The bearing element 56 has one end abutting the second abutment surface 59 and the other end abutting the annular bearing 50 of the retainer and bearing assembly 47.

Grooves 62 are provided in the bearing assembly 47. Since only atmospheric pressure acts on this area, grooves 62 have no effect. Such part 47 is used in this embodiment only as a bearing. The grooves 62 have a function when the part 47 is used in other gauges having a higher pressure range.

Balancing grooves 64 are provided in the body 13 adjacent the lower part of the bore 26 for the purpose of centering the piston 41 in the bore 26 by having the fluid acting around 360°.

The bore 26 intermediate its ends is provided with an annular groove 70 which divides the bore 26 into a pressure zone 72 at one or the lower end of the bore 26 and a non-pressure zone 74 at the other or upper end of the bore 26. An annular seal 76 is interposed in groove 70 and sealingly engages the piston 41 throughout its travel or movement in the bore 26 to prevent air in the pressure zone 72 from entering the non-pressure zone 74.

The outside diameter of the spring guide 46 and the outside diameter of the spring 45 are less than the inside diameter of the tubular piston 41. The piston 41 forms a support and guide for the spring 45 and helps to hold it concentric. The spring retainer and bearing assembly 47 helps to retain the spring 45 and to prevent the rod 49 from wobbling or tilting.

Applied to the exterior surface of the body 13 is the upright scale 80 for measuring, as an example, pressures between 0-100 PSIG; 0-60 PSIG; and 0-30 PSIG. In the illustration shown in FIG. 1, the scale indicates pressures of 0 to 60 PSIG. Additional scales 80 are also applied to the body 13, being 90-degree related therearound whereby, pressure indications may be read throughout 360 degrees.

The downwardly opening annular indicator cap 81 has an axial bore 82 receiving the piston rod 49. The cap 81 is secured to the piston rod 49 by the transverse set screw 83, FIG. 2. Elongated upright scale indicator sleeve 84 of a plastic material, at its upper end projects up into the cap 81 and is secured thereto. The indicator sleeve 74 is arranged outwardly of the upper end of the body 13 therearound, overlies the respective scale or scales 80 and has adjacent its lower end the annular scale reader slot 85.

Accordingly, upon the application of pressure to the passage 19, there will be a corresponding upward movement of the piston 41 and associated piston rod 49 compressing the spring 45 and effecting a corresponding longitudinal movement of the scale indicator sleeve 84. So variably elevated depending upon the pressures applied, there can be a direct visual reading of the scales 80 through the annular indicator slot 85 viewed from any direction throughout 360 degrees.

The upper end of the scale indicator sleeve 84 has an annular assembly flange 86 which is frictionally or otherwise projected up into the depending flange of the cap 81 so that the indicator sleeve 84 moves in unison with longitudinal adjustments of piston rod 49.

A cylindrical enlarged top enclosure 87 of a plastic or metal material is mounted over and around the body 13 and outwardly of the indicator sleeve 84 surrounding the same. The upper portion of top enclosure 87 may be opaque whereas, the lower part of the enclosure 87 includes plastic transparent enclosure member 88 as a part of or connected to top closure 87. The lower end of the enclosure element is staked to the body 13 at three or more circumferentially spaced areas or fingers such as at 91 as shown in FIG. 2. The staked fingers 91 are received in groove 25 to interlock the closure element 88 with body 13.

A vent aperture 89 is provided through the lower portion of the closure element 88 to permit the movement of atmospheric air to and from the interior of the enclosure upon vertical adjustments of the indicator sleeve 84 and attached cap 81 to avoid any compression of air therein within the top enclosure 87 and 88.

The pressure indicator 11 may be used for testing the pressure of oils, water, gas, air at high and low temperatures and involving corrosive atmospheres.

Rather than providing an upright scale 80 with a designated numerical pressure range on the body 13, a color coded indicator or scale without numbers, consisting of one or more annular bands of different colors, may be employed on the body 13. A suitable decal or label forming the indicator or scale is provided and consists, as an example, of a lower annular green band and an upper annular red band. When the indicator sleeve 84 moves upwardly, the annular scale reader slot 85 will first overlie the green band indicating pressure in the safe range of 0-30 PSIG.

As the sleeve 74 moves further upwardly, the slot 85 will overlie the red band indicating a "dangerous" condition where the pressure is approaching the rated 60 PSIG as illustrated. A gauge with a color coded scale illustrates a spectrum of pressure. Such a gauge serves as a "go" or "no-go" indicator and is used in applications where an exact pressure "read-out" is not desirable but only an acceptable operating range is required. Other advantages are less down-time by preventing vehicle, machine and tooling breakage and by preventing unauthorized tinkering in many plants when machine operators and other plant personnel tinker with the fluid system operating relief valve. A further advantage is that a person can obtain a 360° system analysis when it is important to monitor the proper operating range. The maximum pressure range of the gauge is stamped or placed on the gauge. It should be appreciated that any number of different annular "color" bands may be used, with each band generally representing a range of pressures.

I claim:

1. A pressure indicator having a body with an attachment shank with a pressure fluid passage, a cylinder bore at one end communicating with said passage and having the other end opened and threaded, an end plug with inner and outer ends, said plug having a bore and a counter-bore snugly threaded into said open other end, the bore of said end plug terminating at said inner end in a first annular flat abutment surface which faces said one end of said body, the counterbore of said end plug terminating in a second annular flat abutment surface located between the inner and outer ends of said plug and forming one end of said plug bore, a piston nested in said cylinder bore having a piston rod axially extending through said cylinder bore and projecting through and outwardly of said plug, a compression spring interposed at its ends between said plug and piston yieldably biasing said piston towards said one end of said cylinder bore, said piston being variably movable longitudinally against said spring on application of pressure to said pressure fluid passage, and an integral annular spring retainer and bearing assembly having a bore through which said piston rod extends, said assembly having an annular bearing, an annular spring guide and a flange separating said bearing from said guide, said bearing extending into and piloting in the bore of said end plug and being spaced from said second abutment surface, said flange abutting said first abutment surface and said spring guide piloting one end of said compression spring.

2. The pressure indicator defined in claim 1 wherein an annular bearing element is located in said plug bore and surrounds said piston rod, said bearing element having one end abutting said second abutment surface and the other end abutting the annular bearing of said retainer and bearing assembly.

3. The pressure indicator defined in claim 2 wherein said annular bearing element is made from self lubricant material.

4. The pressure indicator defined in claim 3 wherein said material is Teflon.

5. The pressure indicator defined in claim 1 wherein said pressure fluid passage is provided with a filter and a restrictor.

6. The pressure indicator defined in claim 1 wherein said piston is formed separately from said piston rod, said piston being hollow and closed at one end, said closed end having a recess, and said piston rod having a head received in said recess.

7. The pressure indicator defined in claim 6 wherein a spring keeper surrounds said piston rod and is located within said piston, said compression spring biasing said keeper against the closed end of said piston to thereby retain said piston rod head in said recess.

8. The pressure indicator defined in claim 1 wherein the cylinder bore intermediate its ends is provided with an annular groove which divides said bore into a pressure zone at said one end of the cylinder bore and a non-pressure zone and an annular seal located in said groove and sealingly engageable with said piston throughout its movement in said cylinder bore to prevent fluid in said pressure zone from entering said non-pressure zone.

9. The pressure indicator defined in claim 8 wherein the wall of said cylinder bore in said pressure zone is provided with fluid balancing grooves.

10. The pressure indicator defined in claim 8 wherein said piston is elongated and hollow, said piston being closed at the end adjacent said one end of said cylinder bore, said piston having a length approximately equal to the distance between said annular seal and said one end of said cylinder bore.

11. The pressure indicator defined in claim 1 wherein said piston rod is made from a material different than said bearing thereby eliminating binding therebetween.

12. The pressure indicator defined in claim 1 wherein said body outwardly of its threaded end having a counterbore of increased diameter defining a stop shoulder, a transverse top flange on said end plug nested in the counterbore of said body and bearing against said shoulder, said body longitudinally inward of said shoulder having an annular tapered surface spaced from said plug below said top flange, and an O-ring seal compressively nested between said tapered surface and said plug.

13. The pressure indicator defined in claim 1 wherein an upright scale is imprinted upon the exterior of said body longitudinally thereof indicating PSIG, a downturned cap axially receiving and secured to the end of said piston rod, surrounding and spaced outwardly of said body at its upper end, a transparent cylindrical scale indicator secured to and depending from said cap surrounding said body, and an annular scale reader groove formed in said scale indicator registering along the height of said scale for directing reading the pressure applied to said fluid passage.

14. The pressure indicator defined in claim 13 wherein there being a series of 90-degree spaced additional scales imprinted on and around said body for readability of pressures throughout 360 degrees.

15. The pressure indicator defined in claim 13 wherein there being an annular groove formed in said body adjacent the shank end thereof, a cylindrical enclosure having a transparent portion loosely receiving said scale indicator with its open end bearing said body adjacent said annular groove, and a plurality of circumferentially spaced staked fingers on said enclosure which are located in said annular groove to secure said enclosure to said body.

* * * * *